UNITED STATES PATENT OFFICE.

WILLIAM R. CHAPIN, OF INDIANAPOLIS, INDIANA.

STEEL-CEMENT.

1,362,472.  Specification of Letters Patent.  Patented Dec. 14, 1920.

No Drawing.  Application filed August 25, 1919. Serial No. 319,651.

*To all whom it may concern:*

Be it known that I, WILLIAM R. CHAPIN, a citizen of the United States, residing at Indianapolis, in the county of Marion and State of Indiana, have invented certain new and useful Improvements in Steel-Cement, of which the following is a specification.

This invention relates to cementing or joining metals, more especially to joining pieces of steel usually of different compositions and character. There have been proposed the use of compounds, to be placed between the pieces to be cemented, which upon heating melt and cement the adjoining metals; it being among the objects of my invention to improve such compounds so that their action may be more reliable and uniform, and the joint tougher and more permanent than hitherto.

In carrying the objects of my invention into effect I provide a mixture containing an iron alloy, a flux and finely divided iron or steel. In my prior application, Serial No. 294,182, filed May 2, 1919, I have described and claimed a mixture of ferro-silicon, borax and cast iron shot, and the present invention constitutes an improvement over the said mixture.

I have found that by substituting borax glass powder for the borax or burnt borax previously used, the action of the mixture in cementing is made more uniform and the joint tougher. Both borax and burnt borax have a tendency to absorb moisture from the air and when the mixture containing them is heated to fusion in cementing two pieces together, bubbling takes place which destroys the continuity of the joint and weakens it. This action although less in the case of burnt borax than in ordinary borax, is sufficient to seriously weaken the joint.

I heat borax to about 1300 degrees F. to melt the same, allow it to solidify and grind to 60 mesh; the powdered borax glass thus produced contains practically no moisture and has no tendency to absorb it from the atmosphere. To this powder I add ferro-silicon and some form of finely divided iron, such as steel filings, preferably those obtained from saw manufacture, since they may be readily obtained, and such filings are in a very finely divided state.

Two pieces to be cemented, for instance a high speed steel toolhead and low carbon steel shank, are placed in contact with the cementing mixture placed between. The whole is heated to 2250 to 2300 degrees F. in a heating arrangement which will not blister the steel, or until the cement flows freely, when the work is quickly removed, the excess cement squeezed out by a vise, press, weight or any other suitable means, and the tool quenched and tempered. The tool which consists of a hard, high speed steel point and a tough low carbon steel shank is very much stronger than the ordinary high speed steel tool because of the tough shank which has been cemented to the cutting portion. The joint is very strong and much tougher than if produced by other mixtures.

By this mixture I am enabled to satisfactorily join high speed steel or stellite to low carbon steel or any two pieces of steel together, and I can make punches, dies or tools of various kinds which are very durable and cheap to manufacture.

Having thus fully described my said invention, what I claim as new and desire to secure by Letters Patent, is:

1. A cementing mixture comprising an iron alloy, borax glass, and iron.

2. A cementing mixture comprising ferro-silicon, borax glass powder, and steel filings.

3. A cementing mixture comprising iron and borax glass.

In witness whereof I have hereunto set my hand and seal at Indianapolis, Indiana, this 20 day of August, A. D. nineteen hundred and nineteen.

WILLIAM R. CHAPIN. [L. S.]

Witnesses:
H. V. BIERMAN,
M. L. SHULER.